United States Patent
Clavel et al.

(10) Patent No.: US 11,691,039 B2
(45) Date of Patent: Jul. 4, 2023

(54) AIRCRAFT COMPRISING A PROPULSION ASSEMBLY AND A FIRE-FIGHTING SYSTEM FOR THE PROPULSION ASSEMBLY

(71) Applicant: Airbus Operations (S.A.S.), Toulouse (FR)

(72) Inventors: Thierry Clavel, Toulouse (FR); Stéphane Pugliese, Toulouse (FR); Arnaud Guichot, Toulouse (FR); Nicolas Brachet, Blagnac (FR)

(73) Assignee: Airbus Operations (S.A.S.), Toulouse (FR)

( * ) Notice: Subject to any disclaimer, the term of this patent is extended or adjusted under 35 U.S.C. 154(b) by 156 days.

(21) Appl. No.: 17/318,684

(22) Filed: May 12, 2021

(65) Prior Publication Data
US 2021/0353986 A1 Nov. 18, 2021

(30) Foreign Application Priority Data
May 13, 2020 (FR) ...................... 2004694

(51) Int. Cl.
*A62C 3/08* (2006.01)
*A62C 37/40* (2006.01)
(52) U.S. Cl.
CPC ............... *A62C 3/08* (2013.01); *A62C 37/40* (2013.01)
(58) Field of Classification Search
CPC .................................. A62C 3/08; A62C 37/40
See application file for complete search history.

(56) References Cited

U.S. PATENT DOCUMENTS

| 2,385,825 A | 10/1945 | Mathisen |
| 2,577,744 A | 12/1951 | Faust |
| (Continued) | | |

FOREIGN PATENT DOCUMENTS

| EP | 3 572 127 A2 | 11/2019 |
| FR | 3 022 219 A1 | 12/2015 |
| (Continued) | | |

OTHER PUBLICATIONS

French Search Report for Application No. 2004694 dated Jan. 20, 2021.

*Primary Examiner* — Joseph A Greenlund
(74) *Attorney, Agent, or Firm* — KDW Firm PLLC

(57) ABSTRACT

An aircraft with at least one propulsion assembly and its fire-fighting system, which includes two reservoirs of extinguishing agent, and, associated with each reservoir, a control that can be actuated by a pilot to open the reservoir, a detection assembly to detect a fire and emit, if appropriate, a fire alert signal, the propulsion assembly including a first and a second compartment each including at least one fire zone, the fire-fighting system including a bypass valve controlled by a localization unit, a set of pipes connecting each reservoir to each of the fire zones through the bypass valve, the localization unit configured to detect a fire in a fire zone in the first compartment, and, if appropriate, control the bypass valve so it adopts a first state where the extinguishing agent in a reservoir is expelled towards the one or more fire zones in the first compartment after activation of the control associated with a reservoir, the bypass valve otherwise being controlled to adopt a second state, in which the extinguishing agent in a reservoir is expelled towards the one or more fire zones in the second compartment.

7 Claims, 3 Drawing Sheets

(56) References Cited

U.S. PATENT DOCUMENTS

| | | | | |
|---|---|---|---|---|
| 4,566,542 A * | 1/1986 | Enk | .......... | A62C 3/08 |
| | | | | 169/62 |
| 10,336,464 B2 * | 7/2019 | Charlemagne | .......... | F01D 25/24 |
| 10,583,445 B2 * | 3/2020 | Rogers | .......... | A62C 31/02 |
| 10,760,496 B2 * | 9/2020 | Muller | .......... | F02C 7/22 |
| 11,344,757 B2 * | 5/2022 | Budd | .......... | A62C 3/08 |
| 2011/0242724 A1 * | 10/2011 | Feau | .......... | F02C 7/266 |
| | | | | 361/253 |
| 2011/0315408 A1 * | 12/2011 | Kallergis | .......... | A62C 3/08 |
| | | | | 169/46 |
| 2016/0368618 A1 * | 12/2016 | Charlemagne | .......... | F02C 7/12 |
| 2017/0211483 A1 * | 7/2017 | Thiriet | .......... | B64D 27/10 |
| 2019/0003396 A1 * | 1/2019 | Pilon | .......... | G08B 29/188 |
| 2019/0126082 A1 * | 5/2019 | Wright | .......... | A62C 37/44 |
| 2019/0323899 A1 * | 10/2019 | Merat | .......... | G01K 15/007 |
| 2019/0351269 A1 * | 11/2019 | Phung | .......... | A62C 3/08 |
| 2020/0094089 A1 * | 3/2020 | Hagge | .......... | A62C 5/00 |
| 2020/0171429 A1 * | 6/2020 | Giroud | .......... | A62C 3/08 |
| 2020/0298036 A1 * | 9/2020 | Partridge | .......... | B64D 45/00 |
| 2020/0300171 A1 * | 9/2020 | Sawyers-Abbott | .......... | F02C 9/18 |
| 2020/0324154 A1 * | 10/2020 | Cayssials | .......... | A62C 35/13 |
| 2021/0283446 A1 * | 9/2021 | Piech | .......... | A62C 37/50 |
| 2021/0353986 A1 * | 11/2021 | Clavel | .......... | F02C 7/25 |
| 2022/0299376 A1 * | 9/2022 | Newlin | .......... | G01K 1/12 |

FOREIGN PATENT DOCUMENTS

| | | |
|---|---|---|
| GB | 651 070 A | 3/1951 |
| WO | WO 81/01796 A1 | 7/1981 |

* cited by examiner

AIRCRAFT COMPRISING A PROPULSION ASSEMBLY AND A FIRE-FIGHTING SYSTEM FOR THE PROPULSION ASSEMBLY

CROSS-REFERENCE TO RELATED APPLICATION

This application claims priority to French patent application number 20 04694 filed on May 13, 2020, the entire disclosure of which is incorporated by reference herein.

TECHNICAL FIELD

The disclosure herein relates to an aircraft comprising a propulsion assembly and a fire-fighting system dedicated to the propulsion assembly for detecting and extinguishing a fire that could occur in the propulsion assembly.

BACKGROUND

In a known manner, an aircraft has at least one propulsion assembly fastened beneath each of its wings, and, dedicated to each of the propulsion assemblies, a fire-fighting system that makes it possible to detect and extinguish a fire occurring in the propulsion assembly.

FIG. 1 is a schematic representation of a fire-fighting system 1 of the prior art, dedicated to a propulsion assembly 2. The propulsion assembly 2 comprises a plurality of fire zones Z1, Z2 of different sizes, closed by walls and fire seals in order to prevent the fire spreading out of a fire zone and therefore also from one fire zone to the other fire zones.

In each fire zone Z1, Z2, the fire-fighting system 1 comprises at least one detection loop 3 equipped with at least one fire sensor for detecting the start of a fire. All the detection loops 3 are electrically connected to a detection unit 4 configured to trigger an audible or visual fire alarm in the cockpit intended for the pilots in the event of a fire being detected by a fire sensor in a fire zone Z1, Z2.

After a fire alarm has been triggered, the pilot follows a procedure that brings him or her to actuate a first control C1 located in the cockpit so as to trigger the emission, towards each of the fire zones Z1, Z2, of a volume of extinguishing agent contained in a first reservoir R1. If the fire persists, the pilot actuates a second control C2 located in the cockpit so as to reproduce the same action, but this time with a second reservoir R2.

Since the detection unit 4 is not, by design, able to detect precisely which fire zone Z1, Z2 is on fire, each reservoir R1, R2 contains a volume of agent that is necessary for supplying all the fire zones Z1, Z2 with enough extinguishing agent to extinguish a fire therein.

Such a fire-fighting system is entirely satisfactory, however the requirement to reduce mass and/or bulk, which predominates in aircraft construction, induces the need to find a fire-fighting system that offers the same efficiency but with a reduced mass and/or volume.

SUMMARY

The disclosure herein aims to meet all or part of this need and relates to an aircraft comprising a cockpit, at least one propulsion assembly and a fire-fighting system dedicated to each propulsion assembly, each fire-fighting system comprising two reservoirs each containing an extinguishing agent, and, associated with each reservoir, a control that can be actuated by a pilot so as to open each reservoir in order to release the extinguishing agent from the reservoir, a detection assembly configured to detect a fire in the propulsion assembly to which the fire-fighting system is dedicated and emit, if appropriate, a fire alert signal intended for a visual or audible transducer situated in the cockpit, the propulsion assembly comprising a first and a second compartment each comprising at least one fire zone, and the fire-fighting system comprising a bypass valve controlled by a localization unit, a set of pipes connecting each reservoir to each of the fire zones through the bypass valve, the localization unit being configured to detect a fire in the one or more fire zones in the first compartment, and, if appropriate, control the bypass valve so that it adopts a first state, called controlled state, in which the extinguishing agent in a reservoir is expelled towards the one or more fire zones in the first compartment after activation of the control associated with the reservoir, the bypass valve otherwise being controlled so as to adopt a second state, called default state, in which the extinguishing agent in a reservoir is expelled towards the fire zones in the second compartment after activation of the control associated with the reservoir.

According to the disclosure herein, the fire-fighting system is capable of determining, in the event of a fire occurring, whether or not this fire started in the first compartment, and of orienting the diffusion of the extinguishing agent only towards the one or more fire zones in the first compartment if the latter is on fire, or towards the one or more fire zones in the second compartment otherwise. The volume of extinguishing agent in each reservoir can thus be reduced compared with the prior art, since there is no longer any obligation to contain a volume allowing a fire in all the fire zones of the propulsion assembly to be extinguished.

BRIEF DESCRIPTION OF THE DRAWINGS

The abovementioned features of the disclosure herein, along with others, will become more clearly apparent upon reading the following description of an exemplary embodiment, the description being given with reference to the appended drawings, in which.

DETAILED DESCRIPTION

Figure 1:
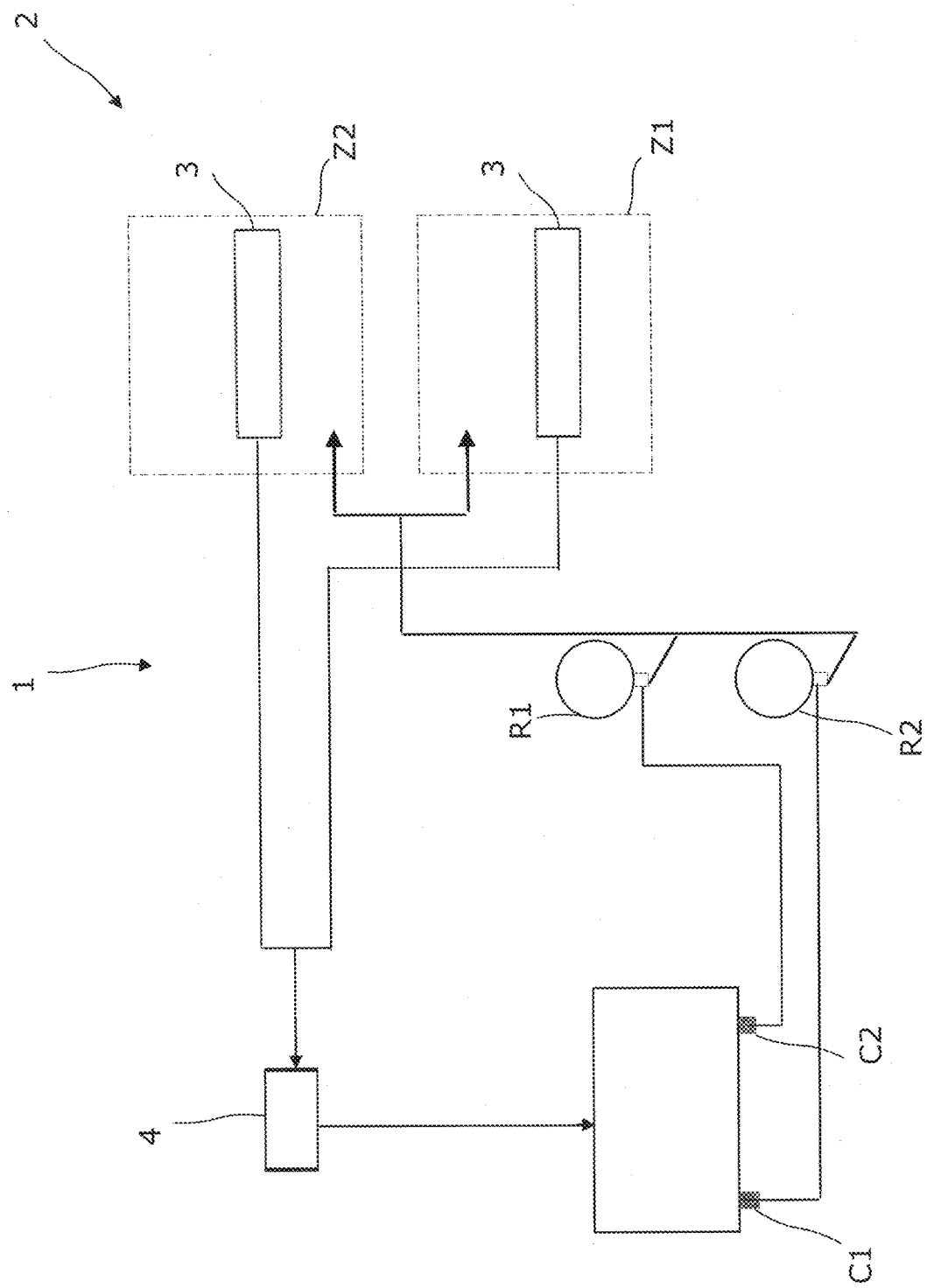
FIG. 1, which has already been described, is a schematic representation of a fire-fighting system of the prior art.
Figure 2:
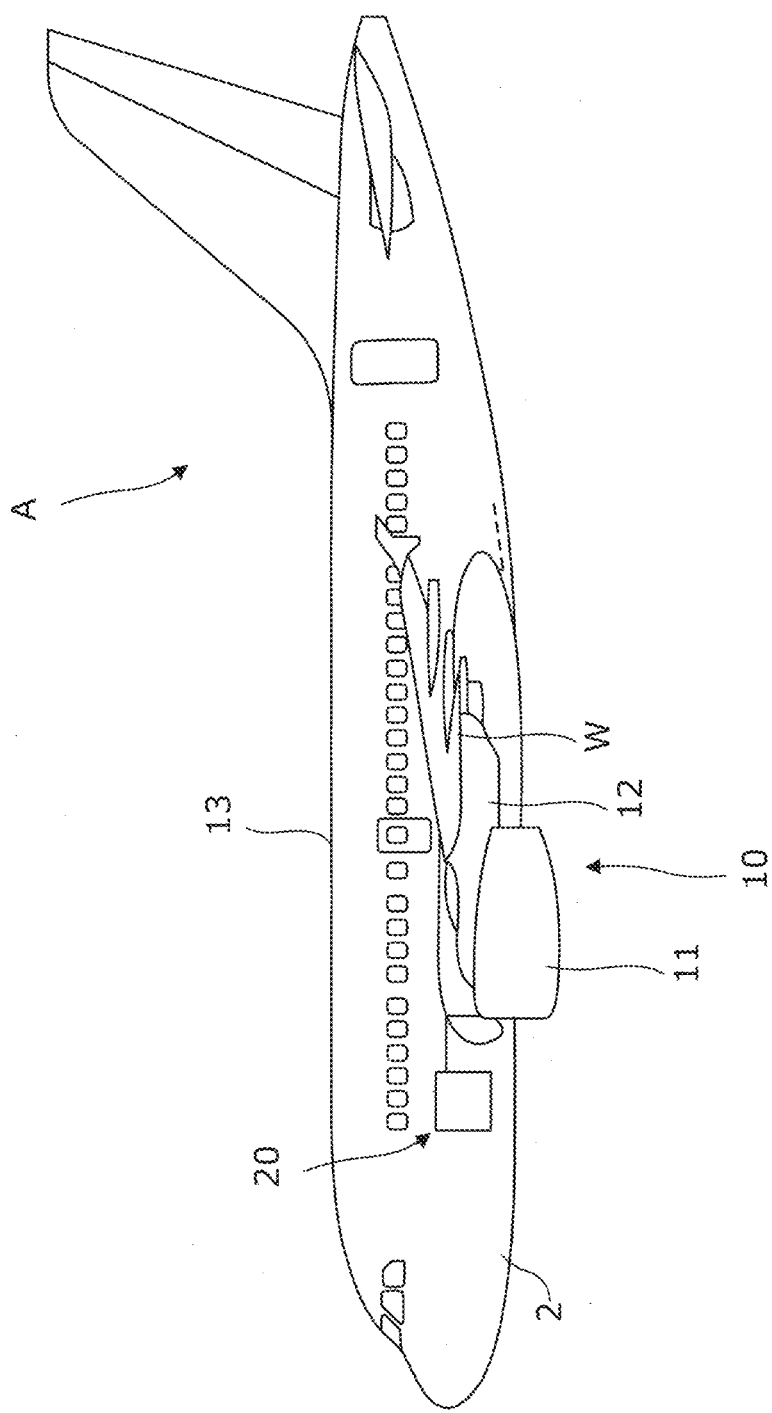
FIG. 2 is a schematic representation of an aircraft according to the disclosure herein, comprising a propulsion assembly and a fire-fighting system dedicated to the propulsion assembly.
Figure 3:
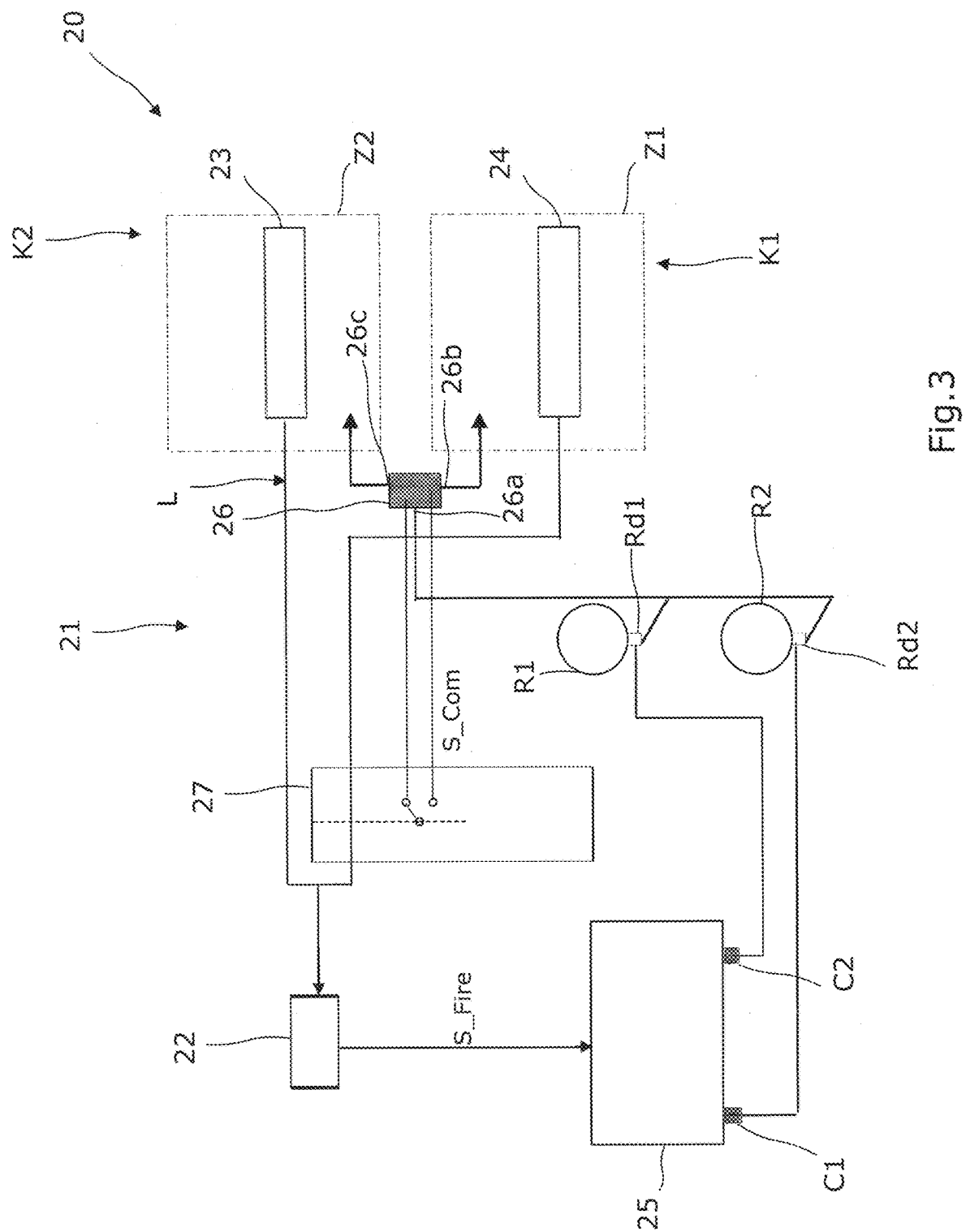
FIG. 3, which is similar to FIG. 1, is a schematic representation of the fire-fighting system of the aircraft illustrated in FIG. 2.

With reference to FIGS. 2 and 3, an aircraft A has at least one propulsion assembly 10 attached beneath each of its wings W. Each propulsion assembly 10 has a nacelle 11 surrounding an engine (not shown), and an engine fastening pylon 12 fastened beneath the wing W of the aircraft and beneath which the engine is attached.

The propulsion assembly 10 is divided into a first and a second compartment K1, K2. Each compartment K1, K2 comprises at least one fire zone Z1, Z2. The fire zones Z1, Z2 of the propulsion assembly 10 are separated from one another by walls and fire seals (not shown) so as to contain any fire within the boundaries of one fire zone and prevent it spreading to another fire zone.

It will be noted that, in the example shown in FIG. 3, two fire zones Z1, Z2 are shown, with one fire zone Z1 belonging to the first compartment K1 and one fire zone Z2 belonging to the second compartment K2. In the rest of the description, unless otherwise stated, this embodiment, in which each compartment K1, K2 comprises a single fire zone Z1, Z2, will be described.

The aircraft A comprises a fire-fighting system 20 dedicated to each propulsion assembly 10 for detecting and extinguishing, via the sending of an extinguishing agent, any fire that may occur.

Conventionally, the fire-fighting system 20 of a propulsion assembly 10 contains two reservoirs R1, R2 (for example with identical capacities) each containing a volume of extinguishing agent, a set of pipes (lines shown in the figures) connecting the reservoirs R1, R2 to all the fire zones Z1, Z2, a detection assembly 21 for detecting a fire and triggering, if appropriate, a fire alert in the cockpit of the aircraft A, and two activation controls C1, C2 situated in the cockpit and able to be actuated by the pilot so as to trigger the emission of extinguishing agent towards the fire to be extinguished, in particular when a fire alert is emitted and heard by the pilot.

Each reservoir R1, R2 that is for example situated in the pylon 12 of the propulsion assembly 10 or the fuselage 13 is equipped with an opening and triggering system.

The opening and triggering system comprises, for example, a discharge head Rd1, Rd2 screwed onto the reservoir and a pyrotechnic cartridge (not shown) arranged in the discharge head Rd1, Rd2 opposite a seal (not shown) that closes the reservoir. The pyrotechnic cartridge of the first reservoir R1 is fired by the actuation of a first activation control C1 so as to break the seal and release the pressurized extinguishing agent from the first reservoir R1. Similarly, the pyrotechnic cartridge of the second reservoir R2 is fired by the actuation of a second activation control C2 so as to break the seal and release the pressurized extinguishing agent from the second reservoir R2. The first and the second control C1, C2 are for example pushbuttons or levers.

The detection assembly 21 comprises a detection unit 22, situated for example in the fuselage 13, and a plurality of detection loops L (only one shown in FIG. 3) electrically connected to the detection unit 22. Each detection loop L comprises at least one part dedicated to a fire zone Z1, Z2 of the propulsion assembly 10, i.e. there is at least one part of a detection loop L for each of the fire zones Z1, Z2 in each compartment K1, K2. A part of a detection loop L comprises, for the fire zone Z1, Z2 to which it is dedicated, at least one fire sensor 23, 24 arranged in the fire zone Z1, Z2. In FIG. 3, the single detection loop L shown comprises a part dedicated to the fire zone Z2 in the second compartment K2, with a fire sensor 23, and a part dedicated to the fire zone Z1 in the first compartment K1, with a fire sensor 24.

The detection unit 22 continuously measures an electrical value of the circuit formed by each of the detection loops L and emits a fire alert signal S_Fire when the measurement of the electrical value is indicative of a fire. The fire alert signal S_Fire is received by at least one visual and/or audible transducer 25 situated in the cockpit in order to trigger a fire alert intended for the pilots and warn them of a fire in the propulsion assembly 10.

In the case in which the electrical value measured is a resistance (in this case, an equivalent impedance measurement), the detection unit 22 emits a fire alert signal S_Fire when the value of the resistance measured on at least one of the detection loops L lies in a range of predetermined values.

According to the disclosure herein, the fire-fighting system 20 is capable of determining, in the event of a fire occurring, whether or not the fire zone Z1, Z2 in a compartment K1, K2 is on fire, and of orienting the diffusion of the extinguishing agent only towards the compartment K1, K2 comprising the fire zone Z1, Z2 that is on fire, or towards the other compartment K1, K2 otherwise.

To this end, the fire-fighting system 20 according to the disclosure herein comprises:
  a bypass valve 26 with an inlet 26a and two outlets 26b, 26c. The inlet 26a of the bypass valve 26 is connected, via a pipe, to each of the reservoirs R1, R2, whereas a first outlet 26b opens via a pipe into the fire zone Z1 in the first compartment K1 and the second outlet 26c opens, via a pipe, into the fire zone Z2 in the second compartment K2.
  a localization unit 27, to which both the one or more detection loops L dedicated to the fire zone Z1 in the first compartment K1, and the bypass valve 26, are electrically connected.

The bypass valve 26 is configured to be commanded to adopt two states, with a first state, called controlled state, in which the fluidic path through the valve goes from the inlet 26a to the first outlet 26b leading to the first compartment K1 and a second state, called default state, in which the fluidic path through the valve passes from the inlet 26a to the second outlet 26c leading to the second compartment K2.

In one embodiment, the bypass valve 26 is, for example, of the electromechanical type and comprises a body (not shown) with an inlet to which are fluidically connected the discharge head of each of the two reservoirs R1, R2 for example by a Y-shaped coupling, and the two fluid outlets 26b-c, one opening via a pipe into the fire zone Z1 in the first compartment K1, the other exiting into the fire zone Z2 in the second compartment K2 via another pipe. The bypass valve 26 comprises an actuator (not shown), electrically connected to the localization unit 27, allowing a mobile flap (not shown) in the body of the bypass valve 26 to be moved. The flap can take one of the following two positions in order to orient the extinguishing agent arriving in the body of the bypass valve 26 via the fluid inlet 26a: a first position corresponding to the controlled state of the bypass valve 26 and a second position corresponding to the default state of the bypass valve 26.

The localization unit 27 is configured to measure an electrical value of the circuit formed by the one or more parts of the detection loops L that are dedicated to the first compartment K1 and send a control signal S_Com to the bypass valve 26 so as to command the valve to adopt its controlled state if the measured value is indicative of a fire; otherwise the bypass valve 26 remains in its default state.

The electrical value measured is, for example, a resistance (equivalent impedance measurement). In this case, the localization unit 27 sends the control signal S_Com when the measured resistance value lies in a range of predetermined values.

The detection logic implemented by the fire-fighting system 20 is as follows if there is a fire in a fire zone Z1 in the first compartment K1:

1) The localization unit detects a fire in the fire zone Z1 and sends the control signal S_Com to the bypass valve 26 so as to position it in its controlled state. Simultaneously, the detection unit 22 detects a fire in the propulsion assembly 10 and emits an alert signal S_Fire. The alert signal S_Fire is converted, by appropriate transducers 25 situated in the cockpit, into a visual and/or audible alarm intended for the pilot.

2) The pilot then activates the fire procedure, and actuates the first control C1: the extinguishing agent in the first cylinder R1 is released towards the first compartment K1 so as to extinguish the fire detected in the fire zone Z1.

3) In the event that the fire alarm is still active in the cockpit a few seconds after the activation of the first control C1, the pilot actuates the second control C2 and the extinguishing agent in the second cylinder R2 is released and expelled towards the first compartment K1.

The detection logic implemented by the fire-fighting system 20 is as follows if there is a fire in a fire zone in the second compartment K2:

1) The localization unit 27 does not detect a fire in the first compartment K1; the bypass valve 26 remains in the default state. By contrast, the detection unit 22 detects a fire in the propulsion assembly 10 and emits an alert signal S_Fire. The alert signal S_Fire is converted, by appropriate transducers 25 situated in the cockpit, into a visual and/or audible alarm intended for the pilot.

2) The pilot then activates the fire procedure, and actuates the first control C1: the extinguishing agent in the first cylinder R1 is released towards the second compartment K2.

3) In the event that the fire alarm is still active a few seconds later, the pilot actuates the second control C2 and the extinguishing agent in the second cylinder R2 is released and expelled towards the second compartment K2.

Preferably, the logic is designed so that as soon as the bypass valve 26 has been positioned in its controlled state and a control C1 or C2 has been actuated, only a maintenance operation on the fire-fighting system 20 by an operator can return the bypass valve 26 to its default state.

In the case in which each of the compartments K1, K2 of the propulsion assembly 10 contains a single fire zone Z1, Z2, the quantity of extinguishing agent contained in each reservoir R1, R2 of the fire-fighting system 20 according to the disclosure herein is constrained by the quantity that is necessary to extinguish the most critical fire zone out of Z1 and Z2.

The design of the fire-fighting system according to the disclosure herein thus makes it possible, compared with the prior art, to reduce the quantity of agent contained in each reservoir R1, R2 and therefore the mass on board the aircraft A.

In the case in which the propulsion assembly 10 has more than two fire zones, for example if one or both compartments each comprise a plurality of fire zones, the fire detection system 20 is modified with respect to that which has been stated above only in that the first fluid outlet 26b of the bypass valve 26 opens, via a pipe, into each of the fire zones in the first compartment K1 if the latter comprises a plurality of fire zones and the second fluid outlet 26c of the bypass valve 26 opens, via a pipe, into each of the fire zones in the second compartment K2 if the latter comprises a plurality of fire zones.

Furthermore, in this case, the localization unit 27 is connected, as well as to the bypass valve 26, to the one or more parts of the detection loops L (and therefore the fire sensors of the detection loops) that are dedicated to the fire zones in the first compartment K1. The localization unit 27 measures an electrical value of the circuit formed by the one or more parts and sends a control signal S_Com to the bypass valve 26 so as to control the valve 26 so that it adopts its controlled state if the signal has a value that is indicative of a fire in the first compartment K1.

In the latter case, the quantity of extinguishing agent contained in each reservoir R1, R2 of the fire-fighting system 20 according to the disclosure herein is constrained by the quantity that is necessary to extinguish the compartment that is the most critical, i.e. that which on the basis of fire simulations is the one that requires the most extinguishing agent to extinguish a fire therein (for example on account of the flammable liquids line passing through the compartment, a greater volume or greater ventilation). Here again, the design of the fire-fighting system 20 according to the disclosure herein thus makes it possible, compared with the prior art, to reduce the quantity of agent contained in each reservoir R1, R2, and therefore the on-board mass.

The choice between the first and second compartments K1, K2 for the choice of controlled/default state for the bypass valve 26 may be arbitrary. In another example, the choice is such that the controlled state of the bypass valve sends the extinguishing agent to the compartment K1, K2 that, compared with the other compartment K2, K1, is the one that has one or more fire zones with the highest probability of fire risk, considering the architecture of the propulsion assembly (type of flammable fluid, number of ducts transporting flammable liquids, environmental condition such as the proximity of the engine and its hot parts).

The subject matter disclosed herein can be implemented in software and/or in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" by either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
a cockpit;
at least one propulsion assembly, each propulsion assembly of the at least one propulsion assembly comprising a first compartment and a second compartment, the first compartment and the second compartment each comprising one or more fire zones; and
a fire-fighting system dedicated to each propulsion assembly of the at least one propulsion assembly, each fire-fighting system comprising:
two reservoirs, each reservoir of the two reservoirs containing an extinguishing agent;

a control that is associated with each reservoir of the two reservoirs and is configured for actuation by a pilot, wherein, when actuated, the control is configured to open the reservoir with which the control is associated for releasing the extinguishing agent from the reservoir with which the control is associated;

a bypass valve;

a set of pipes connecting, through the bypass valve, each reservoir of the two reservoirs to each of the fire zones of the at least one propulsion assembly with which the fire-fighting system is dedicated;

wherein the fire-fighting system is configured:

to detect a fire in the at least one propulsion assembly to which the fire-fighting system is dedicated; and emit, when the fire is detected in the at least one propulsion assembly to which the fire-fighting system is dedicated, a fire alert signal for a visual or audible transducer situated in the cockpit;

when a fire is detected in the one or more fire zones in the first compartment, to control the bypass valve to adopt a controlled state, in which, after activation of the control associated with one or both of the two reservoirs, the extinguishing agent in the one or both of the two reservoirs is expelled towards the one or more fire zones in the first compartment;

otherwise, to control the bypass valve to adopt a default state, in which, after activation of the control associated with one or both of the two reservoirs, the extinguishing agent in the one or both of the two reservoirs is expelled towards the one or more fire zones in the second compartment.

2. The aircraft according to claim 1, wherein the bypass valve comprises an inlet, connected to each of the reservoirs, a first outlet, connected to a pipe that opens into the one or more fire zones in the first compartment, and a second outlet, connected to a pipe that opens into the one or more fire zones in the second compartment.

3. The aircraft according to claim 1, wherein each of the fire-fighting systems comprises a plurality of detection loops that each comprise at least one fire sensor dedicated to each of the one or more fire zones of the propulsion assembly.

4. The aircraft according to claim 3, wherein:

each detection loop of the plurality of detection loops forms a circuit; and each of the fire-fighting systems is configured to:

measure an electrical value of the circuit formed by each of the plurality of detection loops; and emit an alert signal when the electrical value of the circuit is measured to have a value that is indicative of a fire.

5. The aircraft according to claim 4, wherein the electrical value is a resistance.

6. The aircraft according to claim 3, wherein:

each detection loop of the plurality of detection loops forms a circuit; and each of the fire-fighting systems is configured to:

measure an electrical value of the circuit formed by each of the plurality of detection loops that are dedicated to the one or more fire zones in the first compartment; and send a control signal to the bypass valve to control the valve to the controlled state when the electrical value of the circuit is measured to have a value that is indicative of a fire in the first compartment.

7. The aircraft according to claim 6, wherein the electrical value is a resistance.

* * * * *